United States Patent
Petri et al.

(10) Patent No.: US 9,597,847 B2
(45) Date of Patent: *Mar. 21, 2017

(54) METHOD AND APPARATUS FOR INSERTING A SPACER BETWEEN ANNULAR REINFORCEMENT BANDS

(75) Inventors: Patrick A. Petri, Greer, SC (US); Kirkland W. Vogt, Simpsonville, SC (US); Michael Edward Dotson, Greenville, SC (US); Rush W. Marler, Gainesville, GA (US)

(73) Assignee: Milliken & Company, Spartanburg, SC (US)

( * ) Notice: Subject to any disclaimer, the term of this patent is extended or adjusted under 35 U.S.C. 154(b) by 878 days.

This patent is subject to a terminal disclaimer.

(21) Appl. No.: 13/561,272

(22) Filed: Jul. 30, 2012

(65) Prior Publication Data

US 2013/0069273 A1    Mar. 21, 2013

Related U.S. Application Data

(60) Provisional application No. 61/536,695, filed on Sep. 20, 2011.

(51) Int. Cl.
*B29C 65/54*    (2006.01)
*B29C 70/86*    (2006.01)
*B29L 23/00*    (2006.01)
*B29C 70/08*    (2006.01)

(52) U.S. Cl.
CPC ............ *B29C 70/86* (2013.01); *B29C 70/086* (2013.01); *B29L 2023/00* (2013.01)

(58) Field of Classification Search
CPC .... B29C 70/86; B29C 70/086; B29L 2023/00
USPC ........ 264/262, 257, 313; 425/403, 389, 393, 425/405.1
See application file for complete search history.

(56) References Cited

U.S. PATENT DOCUMENTS

| | | | |
|---|---|---|---|
| 2,895,174 A * | 7/1959 | Hockett | ............. B01D 46/0001 210/493.1 |
| 3,458,373 A | 7/1969 | Knipp et al. | |
| 3,750,714 A | 8/1973 | Holman, Jr. et al. | |
| 3,828,827 A | 8/1974 | Witt et al. | |
| 3,957,091 A | 5/1976 | Buyssens et al. | |

(Continued)

FOREIGN PATENT DOCUMENTS

| WO | WO 2011/112920 A1 | 9/2011 |
|---|---|---|
| WO | WO 2012/091754 A1 | 7/2012 |

(Continued)

*Primary Examiner* — Nahida Sultana
(74) *Attorney, Agent, or Firm* — Brenda D. Wentz

(57) ABSTRACT

A method is provided for making an annular reinforcement structure having inner and outer reinforcement bands maintained in concentric alignment by a resilient spacing element positioned between the bands. The method includes the steps of placing the spacing element against the inside face of the outer reinforcement band and compressing the spacing element with a jig, adjacent the top edge of the outer reinforcement band. The spacing element is sufficiently compressed to allow the inner reinforcement band to slide into concentric alignment with the outer reinforcement band, with a minimum of deflection and/or distortion of the inner reinforcement band.

18 Claims, 14 Drawing Sheets

(56) References Cited

U.S. PATENT DOCUMENTS

| | | |
|---|---|---|
| 3,982,580 A | 9/1976 | Inoue et al. |
| 4,073,330 A | 2/1978 | Allard |
| 4,095,637 A | 6/1978 | Krishnan |
| 4,111,249 A | 9/1978 | Markow |
| 4,124,345 A | 11/1978 | Grunner et al. |
| 4,131,149 A | 12/1978 | Roberts, Jr. |
| 4,172,487 A | 10/1979 | Suzuki et al. |
| 4,259,129 A | 3/1981 | Schmidt |
| 4,277,295 A | 7/1981 | Schmidt et al. |
| 4,459,167 A | 7/1984 | Markow et al. |
| 4,489,528 A | 12/1984 | Tolliver |
| 4,684,556 A | 8/1987 | Ohtsuga et al. |
| 4,734,144 A | 3/1988 | Markow |
| 4,846,648 A | 7/1989 | Spence et al. |
| 4,855,096 A | 8/1989 | Panaroni |
| 4,867,217 A | 9/1989 | Laurent |
| 4,972,959 A | 11/1990 | Bielagus |
| 5,006,291 A | 4/1991 | Fish |
| 5,110,190 A | 5/1992 | Johnson |
| 5,201,971 A | 4/1993 | Gifford |
| 5,463,193 A | 10/1995 | Carpenter et al. |
| 5,624,622 A | 4/1997 | Boyce et al. |
| 5,743,975 A | 4/1998 | Sinopoli et al. |
| 6,170,544 B1 | 1/2001 | Hottebart |
| 6,174,478 B1 | 1/2001 | Silver |
| 6,305,430 B1* | 10/2001 | Ishikawa ............... B62D 29/002 138/153 |
| 6,453,961 B1* | 9/2002 | Colantonio ......... B60C 17/0009 152/517 |
| 6,564,842 B2 | 5/2003 | Abinal et al. |
| 6,615,885 B1 | 9/2003 | Ohm |
| 6,769,465 B2 | 8/2004 | Rhyne et al. |
| 6,983,776 B2 | 1/2006 | Thompson et al. |
| 7,013,939 B2 | 3/2006 | Rhyne et al. |
| 7,055,565 B2 | 6/2006 | Ishida et al. |
| 7,178,569 B2 | 2/2007 | Ishida et al. |
| 7,201,194 B2 | 4/2007 | Rhyne et al. |
| 2004/0159385 A1 | 8/2004 | Rhyne et al. |
| 2005/0126669 A1* | 6/2005 | Roedseth ................ B60C 11/00 152/158 |
| 2005/0167213 A1* | 8/2005 | Crissy ................ F16D 65/0006 188/130 |
| 2005/0262925 A1* | 12/2005 | Yokoi ................... G01L 23/222 73/35.12 |
| 2007/0056669 A1* | 3/2007 | Sandstrom ............. B29D 30/02 152/310 |
| 2007/0175561 A1* | 8/2007 | Daghini ................ B60C 15/06 152/542 |
| 2007/0181238 A1 | 8/2007 | Ternon et al. |
| 2009/0114332 A1* | 5/2009 | Daghini ................ B29D 30/50 152/540 |
| 2010/0018420 A1* | 1/2010 | Menard .................. B82Y 10/00 101/333 |
| 2010/0104788 A1* | 4/2010 | Kitano ..................... B29C 51/12 428/36.4 |
| 2011/0223366 A1 | 9/2011 | Petri et al. |
| 2012/0219660 A1* | 8/2012 | Sana ....................... B29C 43/18 425/470 |
| 2013/0147291 A1* | 6/2013 | Woolmer ................. H02K 1/14 310/58 |
| 2014/0016124 A1* | 1/2014 | Chang .................... G01N 21/88 356/237.1 |
| 2015/0024662 A1* | 1/2015 | Duescher ................ B24B 37/30 451/41 |

FOREIGN PATENT DOCUMENTS

| | | |
|---|---|---|
| WO | WO 2012/091755 A1 | 7/2012 |
| WO | WO 2012/091762 A2 | 7/2012 |

* cited by examiner

METHOD AND APPARATUS FOR INSERTING A SPACER BETWEEN ANNULAR REINFORCEMENT BANDS

CROSS REFERENCE TO RELATED APPLICATIONS

This application claims priority to U.S. Provisional Patent Application No. 61/536,695, entitled "Method and Apparatus For Inserting a Spacer Between Annular Reinforcement Bands" which was filed on Sep. 20, 2011, and which is entirely incorporated by reference herein.

JOINT RESEARCH AGREEMENT

The claimed invention was made under a joint research agreement between Milliken & Company and Michelin Americas Research Company, a division of Michelin North America, Inc. The joint research agreement was in effect before the date the claimed invention was made, and the claimed invention was made as a result of activities undertaken within the scope of the joint research agreement.

FIELD OF THE INVENTION

This present invention relates to a method of inserting a resilient spacer between concentric annular reinforcement bands using a jig to temporarily compress the spacer.

BACKGROUND OF THE INVENTION

Various industrial products, such as belts for power transmission, hoses and tires, incorporate a reinforcement material in an elastomeric matrix, to achieve both strength and flexibility. For example, the reinforcing materials may be a textile fabric, a metal sheet, fibers or cords made up of organic polymers, inorganic polymers, metals and combinations thereof. Manufacture of the composite product typically requires that the spatial relationship of the reinforcement material and the elastomeric matrix be consistent throughout.

In some circumstances, it may be advantageous to provide multiple layers of reinforcement material, wherein the layers are uniformly spaced apart, with the space between the reinforcement layers filled with a suitable matrix material, such as an elastomer. The present invention is directed to a novel method of maintaining the spatial relationship of multiple reinforcement bands during the manufacturing process, in particular, maintaining two annular bands in spaced-apart, concentric relationship.

SUMMARY OF THE INVENTION

The spatial relationship of concentric, inner and outer reinforcement bands can be maintained by providing a resilient spacing element, in the annular space between the inner and outer bands. The spacing element may be an annular band or a plurality of discrete shims, arranged in the space between the inner and outer bands. Once the spacer is inserted between the inner and outer reinforcement bands, it can be held in place by friction. In one embodiment of the invention, the thickness of the spacing element in the radial direction is greater than the space between the inner and outer reinforcement bands, such that the spacing element is compressed between the inner and outer reinforcement bands, thereby exerting force against the sides of the bands and increasing frictional resistance to relative movement of the components.

The annular reinforcement structure of the present invention can be constructed by the steps of placing a resilient spacing element against the inside face of the outer reinforcement band and compressing the spacing element against the inside face of the outer reinforcement band with a jig. The jig is proportioned to compress the spacing element against the inside of the outer reinforcement band, adjacent the top edge of the reinforcement band, thereby creating sufficient space for the inner reinforcement band to slide past the jig and the spacing element.

The jig may be an annular band having a circumference that is less than the circumference of the outer reinforcement band and greater than a circumference of the inner reinforcement band, with the radial thickness of the jig being less than the radial distance between the inner and outer reinforcement bands, when the reinforcement bands are concentric. Also within the scope of the invention is a jig having discrete clamps for compressing a spacing element made up of a plurality of shims, which are spaced around the circumference of the outer reinforcement band. The step of compressing the spacing element against the reinforcement band may be automated.

The present invention also includes a machine for compressing the spacing element, to facilitate placing the inner and outer reinforcement bands in concentric relationship. The machine has a plurality of plates, which are spaced around the inside circumference of the outer reinforcement bands. The plates each have a convex surface, which engages and compresses the spacing element against the inside face of the outer reinforcement band, when the plates move from a retracted to an extended position. The plates move radially, in a track, relative to the outer reinforcement band. The tracks are supported by a base. The movement of the plates may be accomplished by providing the plates with pins, which engage one or more spiral grooves in an actuation plate, which rotates relative to the base. For example, as the actuation plate rotates, the pin of each plate rides in the spiral groove to force the plate radially inward or outward in its track.

In the next step, the inner reinforcement band is slid in the axial direction relative to the outer reinforcement band, from the top edge of the outer reinforcement band towards a bottom edge of the outer reinforcement band, while the spacing element is compressed by the jig. The inner reinforcement band is positioned inside the outer reinforcement band, with the inner and outer reinforcement bands oriented concentrically. Once the inner reinforcement band slides past the jig, the jig can removed from between the inner reinforcement band and the outer reinforcement band, and the spacing element is retained in place between the inner reinforcement band and the outer reinforcement band.

In one embodiment of the invention, the jig compresses the spacing element adjacent the top edge of the outer reinforcement band, but the jig does not extend downward, in the axial direction, as far as the bottom edge of the outer reinforcement band. Nevertheless, the spacing element may extend in an axial direction from the top of the outer reinforcement band below the jig, and optionally, as far as the bottom edge of the outer reinforcement band. In other words, the spacing element may be compressed by the jig adjacent the top edge of the outer reinforcement band only, with the portion of the spacing element extending below the jig remaining in its uncompressed state. The inner reinforcement band is inserted into the structure, and the inner reinforcement band slides past the jig and slides against the uncompressed portion of the spacing element. Thus, the inner reinforcement band frictionally engages the spacing element, which maintains the spacing element in the desired orientation between the inner and outer reinforcement bands when the jig is removed.

The spacing element is a resilient material, that is, it can be compressed against the inside face of the outer reinforcement band by the jig a sufficient distance to allow the inner reinforcement band to slide past, and the spacing element can expand once the jig is removed, to frictionally engage the inner reinforcement band. The spacing element may be a porous material, such as a polymer foam, in particular a polyurethane foam. By way of example, the spacing element may be an open-cell polymer foam having a fraction of voids to net volume of 75% or greater. The polymer foam may be a reticulated foam having a fraction of voids to net volume of 90% or greater, such as a reticulated polyurethane foam.

The annular reinforcement structure may be incorporated into a matrix material, such as an elastomer, and the relative spacing of the inner and outer reinforcement bands remains uniform during the manufacturing process. The annular reinforcement structure can be incorporated into a matrix material under conditions whereby the matrix material will flow into the pores or voids in the spacing element, and is then cured. Additionally, the annular reinforcement structure may be embedded in the matrix material. In one embodiment of the invention, the spacing element is a polyurethane foam and the matrix material is polyurethane polymer which fills the voids in the foam. The reinforcement bands may also be porous, and the matrix material may penetrate into the interstices in the reinforcement bands, when the reinforcement structure is embedded in a matrix. Also within the scope of the invention is to permeate the spacing element with a first matrix material and embed the annular reinforcement structure in a second matrix material having a different chemical composition that the matrix material introduced into the spacing element.

The invention has been described in terms of compressing the spacing element against the inside face of the outer reinforcement band, to facilitate insertion of the inner reinforcement band. Nevertheless, it can be understood that the role of the inner and outer reinforcement bands may be reversed. In particular, the inner reinforcement band may be supported from collapsing inward by a suitable form or die located inside the inner reinforcement band, and the spacing element is compressed by a jig against the outside face of the inner reinforcement band. The outer reinforcement band can then be slid in an axial direction to place the inner and outer reinforcement bands in concentric relation, with the jig positioned between the spacing element and the outer reinforcement band.

The present invention includes a method of making an annular reinforcement structure, a method of making a reinforced matrix material, as well an annular reinforcement structure and a reinforced matrix material.

DETAILED DESCRIPTION OF THE INVENTION

Without limiting the scope of the invention, the preferred embodiments and features are hereinafter set forth. All of the United States patents, published applications and unpublished pending applications, which are cited in the specification, are hereby incorporated by reference. Unless otherwise indicated, conditions are 25° C., 1 atmosphere of pressure and 50% relative humidity, concentrations are by weight, and molecular weight is based on weight average molecular weight. The term "polymer" or "polymeric foam" as used in the present application denotes a material having a weight average molecular weight (Mw) of at least 5,000. Such polymeric materials can be amorphous, crystalline, semi-crystalline or elastomeric polymeric materials.

Inner and Outer Reinforcement Bands

Figure 1:
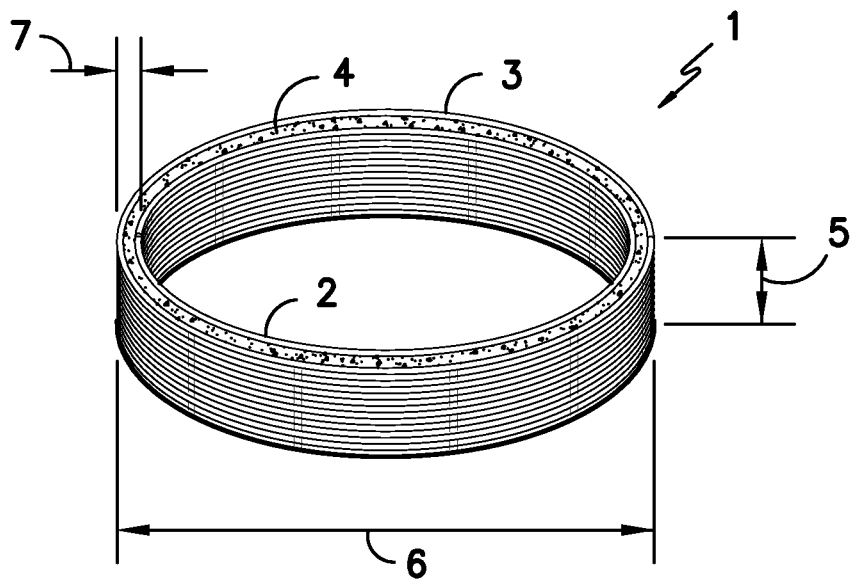
FIG. 1 is a top perspective view of the annular reinforcement structure.
Figure 2:
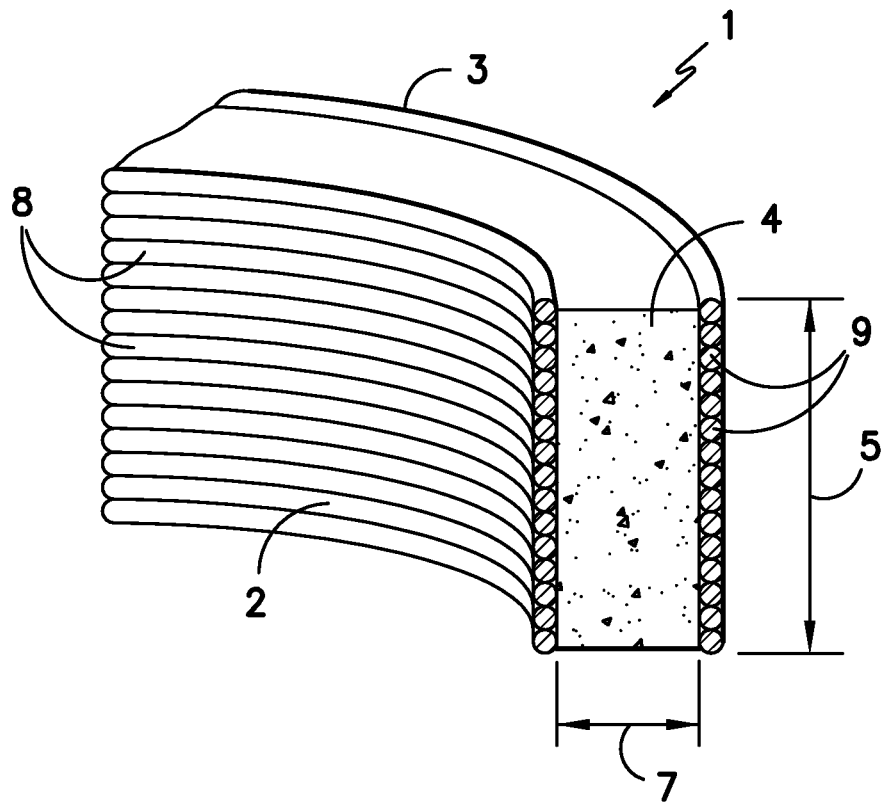
FIG. 2 is a cut-away perspective view of the annular reinforcement structure.

Referring to FIGS. 1 and 2, annular reinforcement structure 1 has inner reinforcement band 2, outer reinforcement band 3, and a spacing element 4. The reinforcement structure may be made with a range of dimensions. By way of example, the width 5 of the annular reinforcement structure, also referred to herein as the width in the axial direction, may range from 0.5 inches to 5.5 feet, and the outside diameter 6 may range from 3 inches to 13 feet. By way of example, the distance between the inner reinforcement band 2 and the outer reinforcement band 3, when the bands are concentric, shown as radial thickness 7, may range from 2 mm to 25 mm.

In various embodiments of the invention it is desirable to allow for relative movement of the inner and outer reinforcement bands within annular reinforcement structure 1, such as may be caused by flexing or shear force. In such circumstances, the annular reinforcement band may be provided with a minimum radial thickness 7 of 5 mm, between the inner and outer reinforcement bands. Applications for the annular reinforcement structure of the present invention, including suitable structures, alignment and spacing of the reinforcement bands, may be found in U.S. Pat. No. 6,769, 465 B2 and U.S. Pat. No. 7,650,919 B2.

Each of the reinforcement bands is a circular strip, characterized as being flexible in the radial direction and relatively inextensible in circumference. In one embodiment of the invention, the reinforcement bands are sufficiently flexible to be subjected to a bend radius that is one-tenth or less of the radius of the band when the band is oriented in the shape of a circle, without experiencing a permanent set in the band. The inner and outer reinforcement bands may be the same or different, both in terms of materials of construction and design.

An advantage of the present invention is that it may be practiced without significant deflection or distortion of the reinforcement bands. Thus, while the reinforcement band may be flexible in a radial direction, it is often desirable to avoid manufacturing steps that will require the reinforcement bands, especially the inner reinforcement band, to be crimped inward during assembly of the annular reinforcement structure.

By way of example, the reinforcement band may be a woven or non-woven textile structure, arrangement of monofilament and/or multifilament cords, bi-component yarns, spun yarns, braided cords, single or multilayer sheets of polymers or metals, or a combination of the foregoing materials. By way of example, the reinforcement bands may be constructed of fiberglass, rayon, nylon, aramid, polyester, carbon or metal, such as steel. The materials may be treated to improve performance, allow for easier manufacturing and/or improve bond strength between materials. Examples include brass-plated steel, elastomer coated cords and the use of adhesion promoters, such as resorcinol-formaldehyde latex. Further examples of suitable reinforcement bands may be found in belts for power transmission, hoses, tires, rollers, strapping and gaskets.

By way of further example, materials having a Young's modulus ($lb/in^2$), of 5,000,000 or greater, or even 10,000,000 or greater, are useful herein. Alternatively, the stiffness of the reinforcement band and the matrix material filling the interstices in the polymer foam spacer may be characterized by a relative Young's modulus of 1,000:1 or even 10,000:1, respectively.

In one example, the reinforcement band may be a monofilament or multi-filament cord wound into a helix and making at least three revolutions. The multiple windings of the cord may be held together by rigid or flexible ribs arranged perpendicular to the cords, such as a yarn intertwined between adjacent cords, for example by weaving or knitting. The intertwined yarn may include fibers that can be melted to fuse the structure together, thereby providing stability to the band, especially in the axial direction. Examples of useful reinforcement band structures may be found in pending U.S. patent application Ser. No. 12/661, 196, filed Mar. 12, 2010, which is hereby incorporated by reference.

FIGS. 1 and 2 show inner reinforcement band 2 and outer reinforcement band 3 constructed of cord 8 and cord 9, respectively, wound into helixes.

Also within the scope of the invention is the use of multi-ply reinforcement bands. For example, layers of reinforcement material may overlay one another, perhaps joined by a suitable binder, adhesive or stitch bond. The plies may be oriented parallel to each other or at an angle, for example, by winding one ply around the other in a spiral. The multi-ply structures are considered as a single reinforcement band herein.

Spacing Element

The spacing element may be a polymer foam structure, such as a polyurethane foam. In addition to polyurethane foam, which includes polyester-polyurethanes and polyether-polyurethanes, examples of polymer foams include polystyrene, polyolefin, in particular polyethylene and polypropylene, polyvinyl chloride, latex rubber, viscoelastic and melamine resin foams. The cell structure of the foam can be controlled by suitable blowing agents, chemical and/or physical. Other additives, such as initiators, catalysts, cross-linking agents, and plasticizers, can be added to promote the reaction and modify the chemical and mechanical properties of the foam.

The foam may be an open-cell or closed-cell foam. Generally, open-cell foam is believed to provide a greater range of applications, particularly when the annular reinforcement structure is embedded in a matrix material and the matrix material fills voids in the polymer foam spacer, as discussed in more detail herein. By way of example, the polymer foams may have a fraction of voids to net volume of foam of 75% or greater, 85% or greater or even 95% or greater. The void fraction may be increased by reticulating the polymer foam spacer, for example, by combustion or chemical degradation. It may be advantageous to remove any "skin" formed on the outer surface of the polymer foam spacer, prior to reticulating the foam. Reticulated polyurethane foam having a fraction of voids to net volume of 90% or greater has been found to be particularly useful.

Another material useful as the spacing element is a nonwoven textile material. By way of example, nonwoven textile materials with thick filaments that are crimped or textured, such as a two or three dimensional corrugated configuration, are believed to be useful in the present invention. Nonwovens with thickness oriented fibers ("z" oriented fibers) can provide resilient properties to the nonwoven.

Yet another material useful as a spacing element is a woven or knitted textile fabric. By way of example, the spacing element may be a fabric that has two face layers separated by fibers or yarns extending between the two layers. The fibers between the two layers provide a spring-like force that opposes the compression of the fabric. The fabric can be designed to meet design parameters, such as openness, pore shape, pore size, stiffness, direction of the separating fiber or yarn, affinity of the fabric to the matrix material, and the like.

Spacing elements having a wide range of physical properties, such as resilience, cell structure and porosity can be employed, depending upon the intended application of the annular reinforcement structure. For most applications, it is desirable that the spacing element has sufficient resilience to be handled without damage, yet be capable of maintaining the relative spacing and alignment of the inner and outer reinforcement bands during subsequent manufacturing steps. In one embodiment of the invention, the polymer foam spacer is elastomeric, that is, the spacer can elastically recover from 30% compression or greater. Polymer foam spacers that can elastically recover from 50% compression, or even from 80% compression or greater, may be advantageous in certain applications.

The spacing element is preferably thicker in the radial direction than the radial distance between the inner and outer reinforcement bands, when the bands are positioned concentrically. Accordingly, when the annular reinforcement structure is assembled, the spacing element will frictionally engage the outside face of the inner reinforcement structure and the inside face of the outer reinforcement structure, to maintain the relative position of the components. By way of example, the radial thickness of the spacing element may be 5% or greater, or even 10% or greater, than the radial distance between the inner and outer reinforcement bands, when the bands are positioned concentrically. Providing a spacing element with substantially uniform thickness in the radial direction promotes even pressure against the inner and outer reinforcement bands, around the circumference of the annular reinforcement structure.

The shape of the spacing element may be an annular band, which includes a strip of material formed into a continuous ring, or a strip of material formed into a ring, with the loose ends loose abutting each other or in close proximity. The annular band is preferably flexible, such that the spacing element can be deformed to facilitate inserting the spacing element against the inner face of the outer reinforcement band, during assembly of the annular reinforcement structure, without causing permanent deformation. By way of example, the spacing element can be subjected to a bend radius that is one-tenth or less of its normal (unflexed) inside diameter, without experiencing a permanent set to the material.

Figure 6:
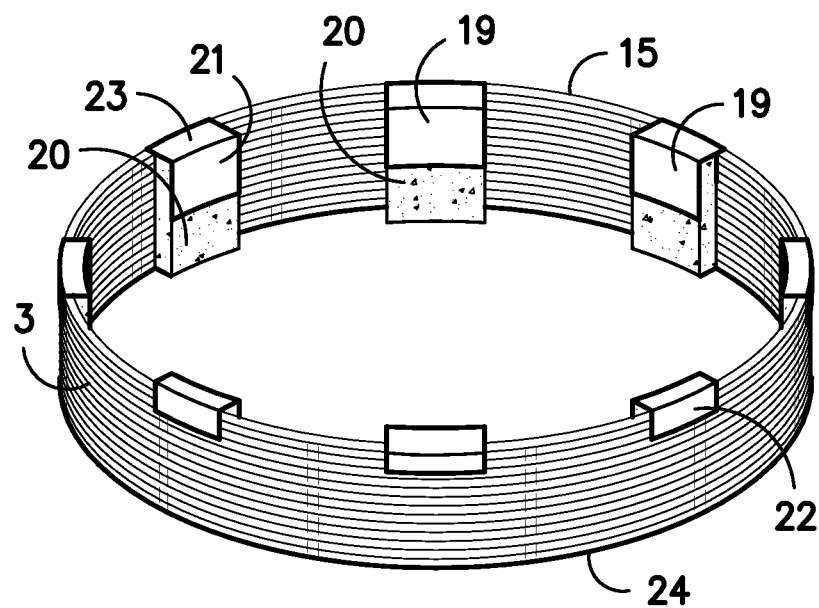
FIG. 6 is a top perspective view of the jig, spacing element and outer reinforcement band, wherein the spacing element is a plurality of discrete shims.

Alternatively, the spacing element may be a plurality of discrete shims, spaced around the circumference of the annular reinforcement structure, as shown in FIG. 6, whereby the number and size of the shims is sufficient to maintain the relative alignment of the inner and outer reinforcement bands during handling and subsequent manufacturing steps. By way of example, an annular reinforcement structure having an outer circumference of 30 inches, may be supported by from 2 to 15 shims evenly distributed around the circumference. The discrete spacing elements may be a polymer foam or textile material, as previously described.

The spacing element is preferably porous, to receive a matrix material, that is, the matrix material permeates interstices or voids in the spacing element, when the annular reinforcement material is embedded in a matrix material.

Also within the scope of the invention is to employ a spacing element that is removable from between the inner and outer reinforcement bands, after the spacing element has achieved its function of maintaining the relative alignment of the reinforcement bands. The removable spacing element may be non-porous.

Jig and Method of Compressing the Spacing Element During Assembly

The annular reinforcement band of the present invention is assembled by compressing the spacing element against a first reinforcement band, thereby allowing the second reinforcement band to be slid in an axial direction past the spacing element and, placing the two reinforcement bands in a concentric relationship. The spacing element is compressed using a jig, which is dimensioned to maintain compression, without causing interference when the second reinforcement band is slid into place.

The method of assembling the annular reinforcement structure of the present invention is primarily described using the example of the spacing element first compressed against the inside face of the outer reinforcement band. It can be understood, however, that the first reinforcement band may be the outer reinforcement band or the inner reinforcement band. If necessary to maintain the shape of the reinforcement band during the assembly steps, a suitable form or die may be employed inside the inner reinforcement band or outside the outer reinforcement band.

Another advantage of the present invention is that it allows the spacing element to be compressed radially without significant distortion or stretching of the spacing element in a circumferential dimension, which may cause thin and thick regions around the circumference.

The jig compresses the resilient spacing element against the inside face of the outer reinforcement band, adjacent the top edge of the reinforcement band, thereby creating sufficient space for the inner reinforcement band to slide past the jig and the spacing element. Thus, the inner reinforcement band may be inserted into the annular reinforcement structure, with little or no inward deflection of the inner reinforcement band. The invention is particularly useful in conjunction with an inner reinforcement band constructed from a cord that has been wound into a helix, such as a monofilament or multifilament steel cord.

The jig may be an annular band having a circumference that is less than the circumference of the outer reinforcement band and greater than a circumference of the inner reinforcement band. When the spacing element is compressed by the jig against the inside face of the outer reinforcement band, the inside face of the jig has a greater circumference than the inner reinforcement band, thereby allowing the inside reinforcement band to slide by the jig, unobstructed. In other words, the combined radial thickness of jig and the compressed spacing element is less than the radial distance between the inner and outer reinforcement bands, when the reinforcement bands are concentric.

Figure 3:
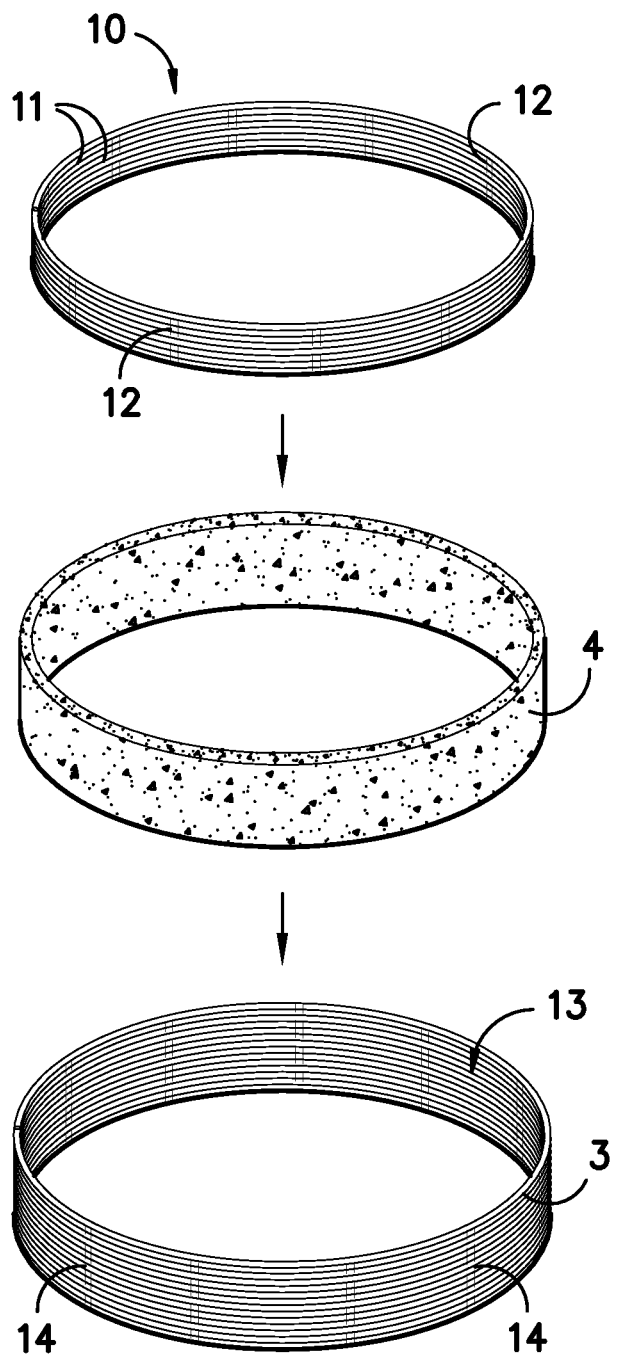
FIG. 3 is an exploded perspective view of the jig, spacing element and outer reinforcement band.
Figure 4:
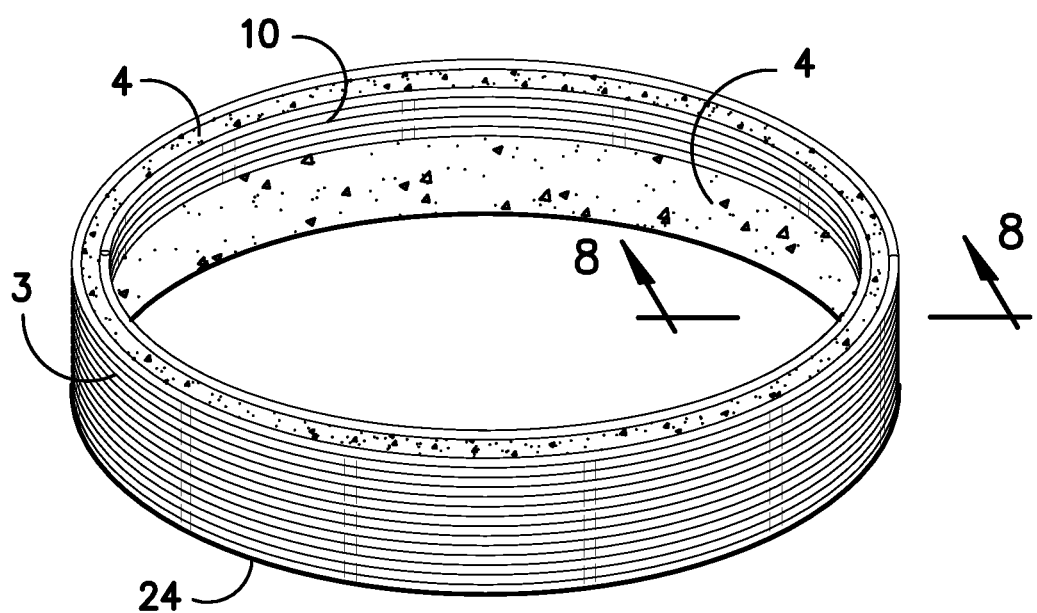
FIG. 4 is a top perspective view of the assembled jig, spacing element and outer reinforcement band.

Referring to FIGS. 3-4, jig 10 may be constructed from a cord 11 that has been wound into a helix, such as a monofilament or multifilament steel cord, which may be brass-plated. Ribs 12 are spaced around the circumference of jig 10 and arranged perpendicular to cords 11. The ribs engage and maintain the orientation of the cords in the annular band. The jig is sufficiently flexible to bend inward, thereby facilitating insertion inside the circumference of the outer reinforcement band, yet be sufficiently spring-like to exert compressive force against the spacing element, to create an opening to slide the inner reinforcement band into the structure. The jig may be produced on a coil-winding machine.

FIG. 3 shows an exploded view of jig 10, spacing element 4 and outer reinforcement band 3. The outer reinforcement band 3 has inside face 13 and ribs 14. The assembled jig 10, spacing element 4 and outer reinforcement band 3 is shown in FIG. 4.

Figure 5:
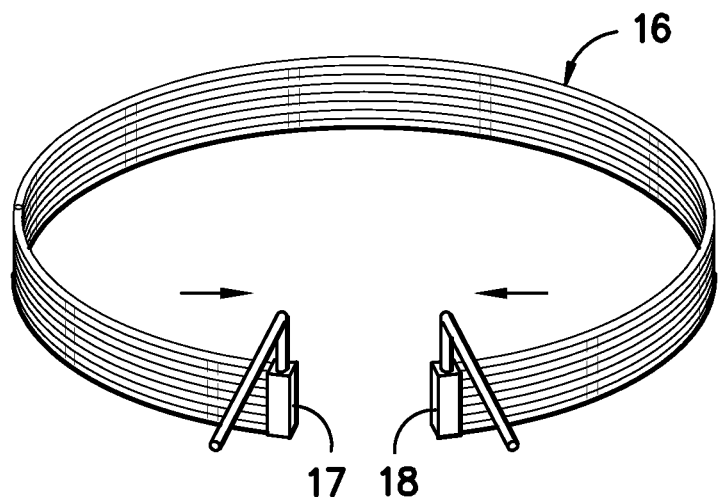
FIG. 5 is a top perspective view of an annular-shaped jig.

Referring to FIG. 5, jig 16 may be a strip of material formed into a ring, with the loose ends 17 and 18 abutting each other or in close proximity, which allows the circumference of jig 16 to be easily decreased and expanded, for insertion and compression of the spacing element, respectively. Jig 16 is believed to be useful for mass production of the annular reinforcement structure. The design and implementation of automated machinery for inserting the jig, compressing the spacing element, and removing the jig after the inner reinforcement band is inserted into the structure is known to those skilled in the art of robotics. The machinery design should accommodate clearance for the insertion of the inner reinforcement band.

Referring to FIG. 6, a jig is provided having discrete clamps 19 for compressing a spacing element made up of a plurality of shims 20, which are spaced around the circumference of the outer reinforcement band. The jig may be constructed of plate 21 and backing 22, joined together by bracket 23, set at the desired distance to compress the spacing element and create the clearance for inserting the inner reinforcement band. Clamps 19 may be arcuate shaped, to conform to the curve of the outer reinforcement band. The function of the clamps can be automated for mass production of the annular reinforcement structure, for example with robotic machinery, without interfering with or requiring deflection of the inner reinforcement band, when the inner reinforcement band is inserted.

Figure 7:
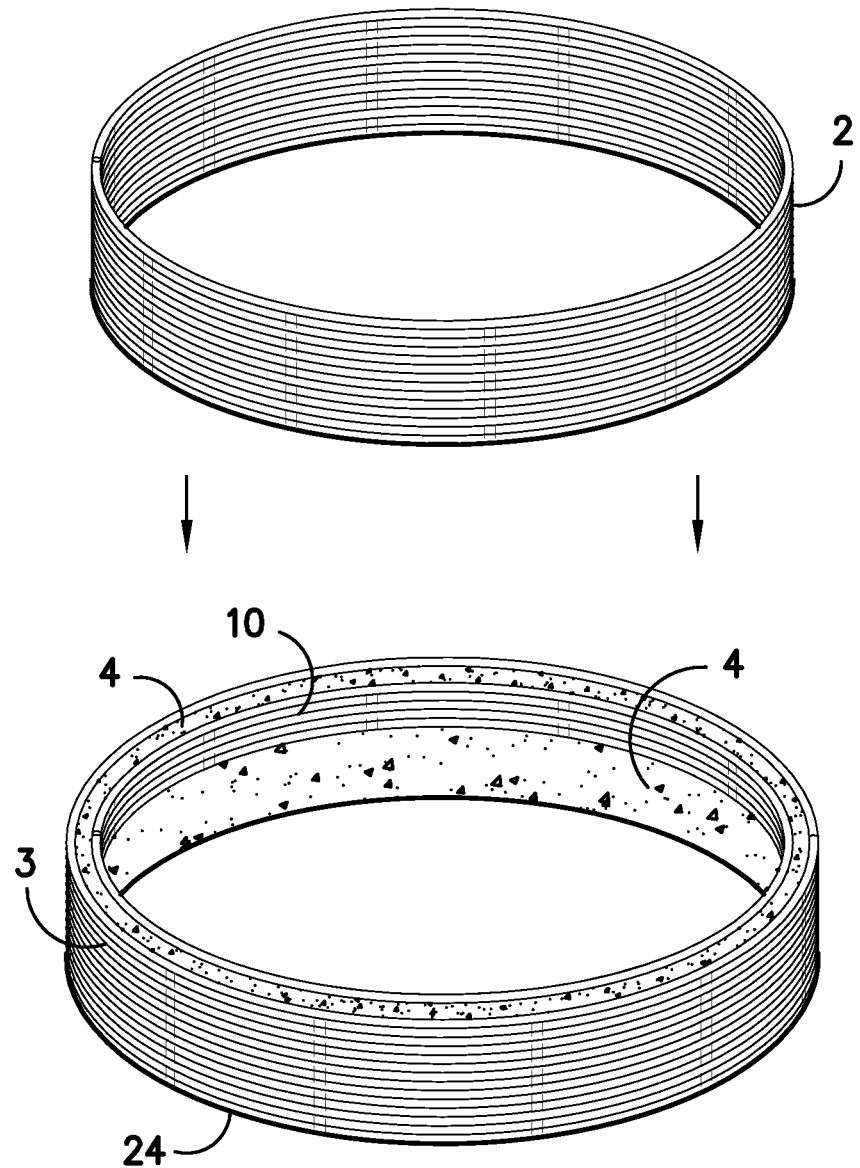
FIG. 7 is an exploded view showing the inner reinforcement band being inserted into the structure shown in FIG. 4.

In one embodiment of the invention, the jig compresses the spacing element adjacent the top edge of the outer reinforcement band, but the jig does not extend downward, in the axial direction, as far as the bottom edge of the outer reinforcement band. Nevertheless, the spacing element may extend in an axial direction from the top of the outer reinforcement band below the jig, and optionally, as far as the bottom edge of the outer reinforcement band. In other words, the spacing element may be compressed by the jig adjacent the top edge of the outer reinforcement band only, with the portion of the spacing element extending below the jig remaining in its uncompressed state. Referring to FIGS. 4 and 7, the axial width of jig 10 is less than the axial widths of spacing element 4 and outer reinforcement band 3, and spacing element 4 extends as far as the bottom edge 24 of the outer reinforcement band 3. Additionally, it can be seen from FIG. 8, that the radial thickness 25 of spacing element 4 is slightly greater than the radial distance between the inner and outer reinforcement bands. FIG. 6 shows an example where the relative widths of clamps 19 is less than the widths of spacing elements 20 and outer reinforcement band 3.

Figure 8:
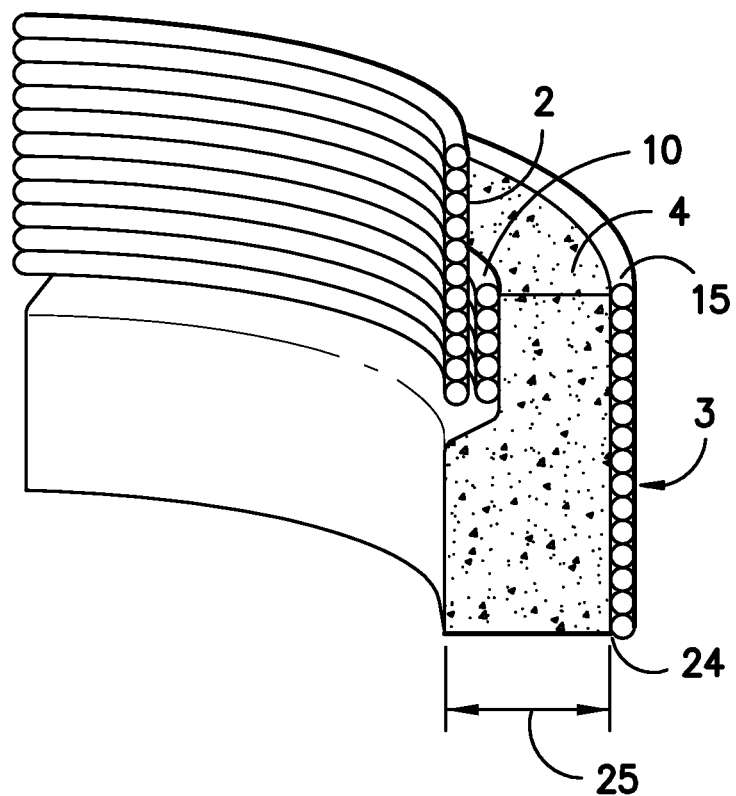
FIG. 8 is a side cross-section view of the inner reinforcement band being inserted into the structure shown in FIG. 4.

Referring to FIGS. 7 and 8, inner reinforcement band 2 is inserted into the assembly of jig 10, spacing element 4 and outer reinforcement band 3 shown in FIG. 4. The inner reinforcement band 2 slides past jig 10 and slides against the uncompressed portion of spacing element 4. Thus, the inner reinforcement band frictionally engages the spacing element, which maintains the spacing element in the desired orientation between the inner and outer reinforcement bands when the jig is removed.

Referring to FIG. 8, a side cross section view of the assembly of FIG. 4 shows how jig 10 compresses spacing element 4 against the inside face 13 of outer reinforcement band 3. The compression of spacing element 4 occurs adjacent the top 15 of outer reinforcement band 3, thereby allowing inner reinforcement band 2 to be inserted into the assembly, without bending or distortion. While annular jig 10 is shown in combination with an annular spacing element, it can be understood that an annular-shaped jig can also be used to compress a spacing element comprising a plurality of discrete shims.

Referring to FIGS. 9-15, a spacing element insertion machine and its operation is illustrated. Insertion machine 30 has base 31, which supports plates 32, spaced around the circumference of base 31. Plates 32 have an arcuate shape, whereby convex side 33 is designed to engage and uniformly compress the spacing element against the inside face of the outer reinforcement band. The radii of the arcuate plates 32 may be selected so that plates 32 represent the arcs of a circle, when the plates are extended to compress the spacing element, prior to insertion of the inner reinforcement band.

Figure 9:
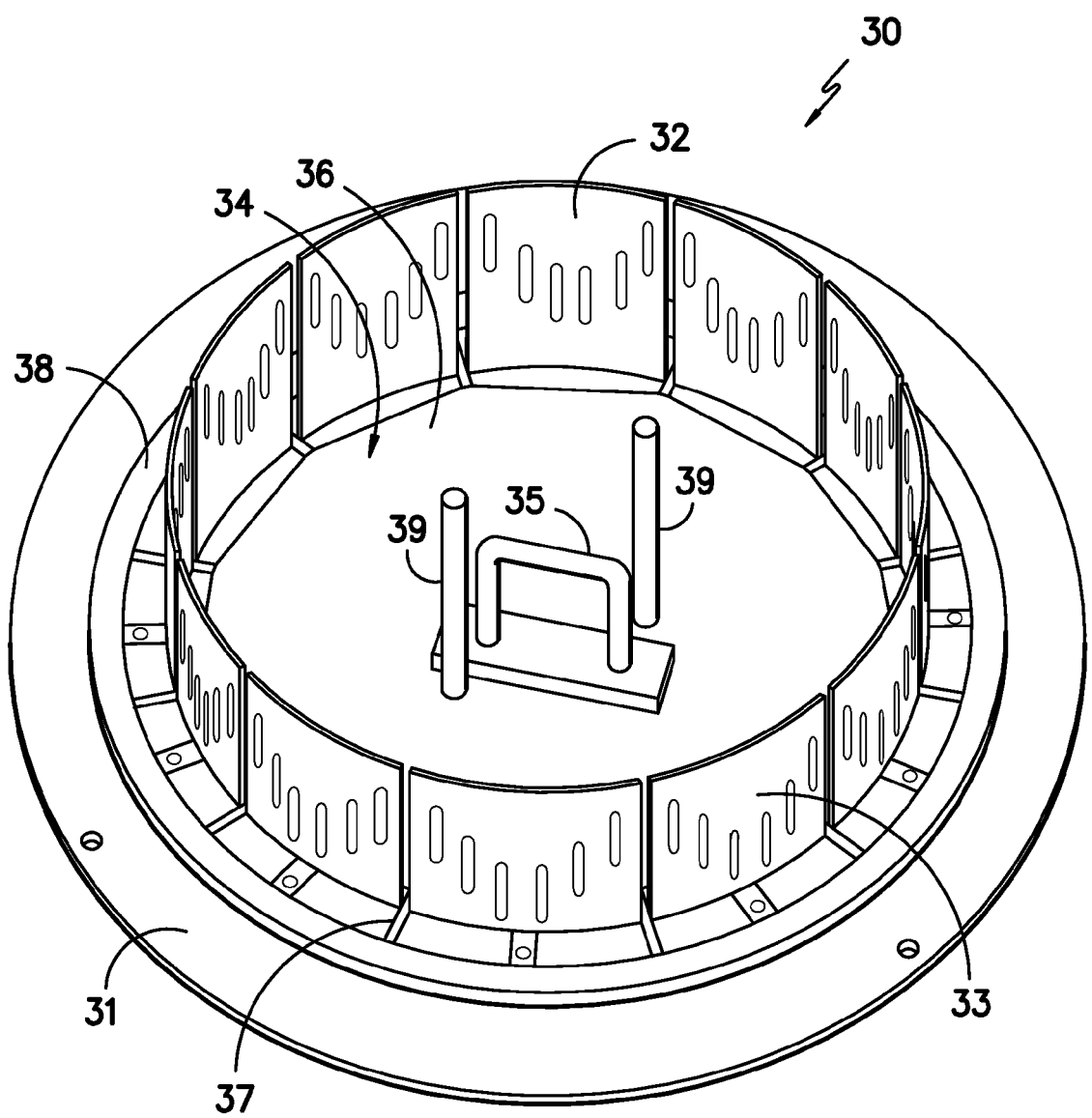
FIG. 9 is a top perspective view of a machine for assembling the annular reinforcement structure.
Figure 15:
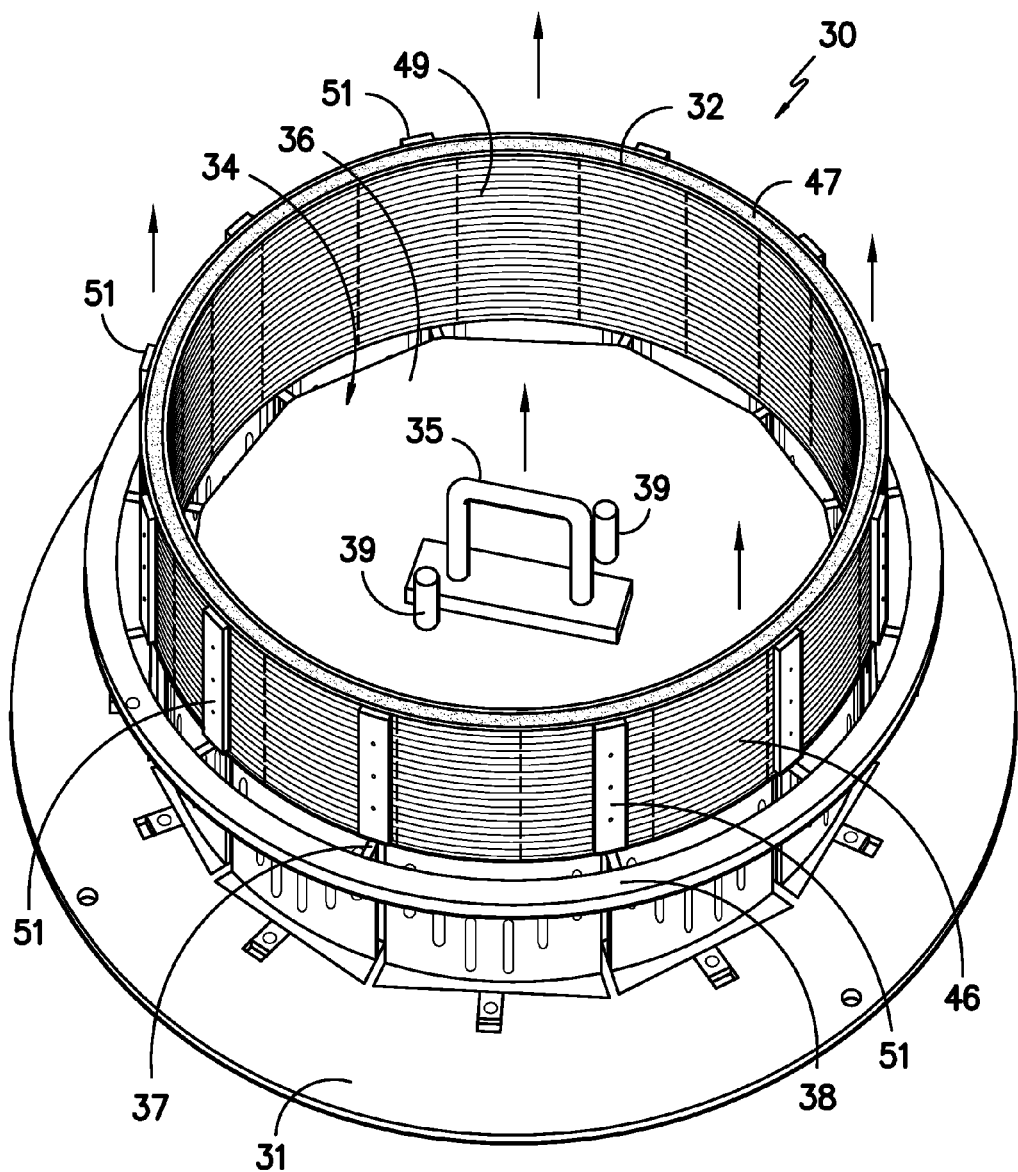
FIG. 15 is a top perspective view showing the annular reinforcement structure being removed from the insertion machine.

FIG. 9 shows removable frame 34, which is temporarily supported by base 31, but can be lifted upward relative to base 31 and plates 32, by pulling handle 35. Frame 34 has hub 36 and spokes 37, which extend between gaps in plates 32. Rim 38 connects spokes 37. Holes are provided in hub 36, allowing frame 34 to slide along guides 39, for example, when the assembled annular reinforcement structure is lifted off of insertion machine 30, as shown in FIG. 15.

Figure 10:
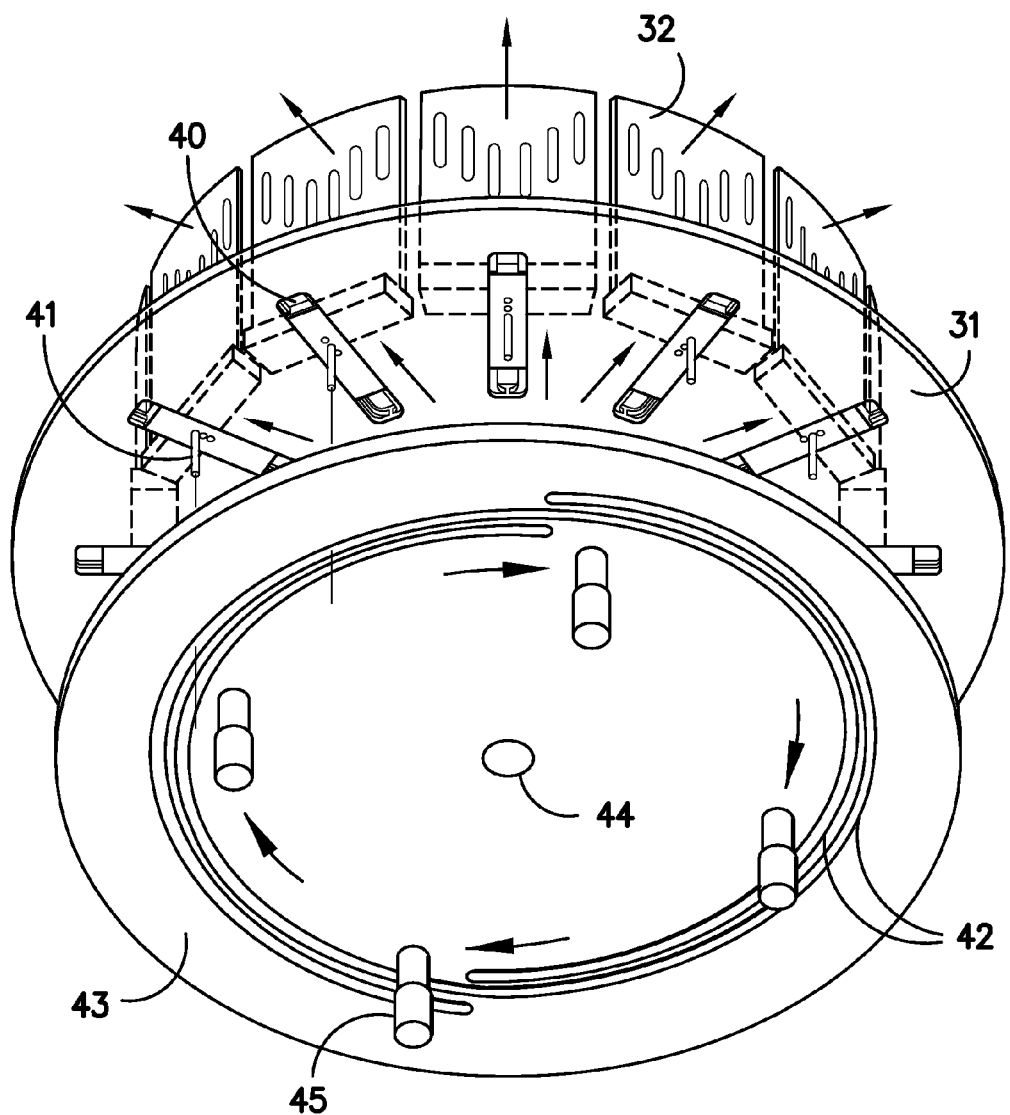
FIG. 10 is an exploded, bottom perspective view of the insertion machine for assembling the annular reinforcement structure showing the mechanism for retracting and extending the plates.

Referring to FIG. 10, the mechanism for retracting and extending plates 32 in a radial direction is shown. Plates 32 slides radially in corresponding tracks 40, which are supported by base 31. Tracks 40 may be integrally formed in base 31 as shown in FIG. 10, for example by cutting slots in base 31, or may be affixed to the surface of base 31, or may be some combination thereof. Tracks 40 are configured to allow radial movement of plates 32 outward from the center of base 31, while maintaining plates 32 in alignment relative to the outer reinforcement band, so that uniform pressure is applied to the spacing element during the compression step. In one example, each of the lower portion of plates 32 and tracks 40 may be provided with corresponding tongue and groove features, which prevent plates 32 from tilting during operation.

The bottom portions of each of plates 32 have pins 41 extending downward, past the underside of base 31. Pins 41 engage one of spiral grooves 42 in actuation disk 43, which can be rotated on spindle 44, affixed to base 31. Actuation disk 43 can be rotated by turning arms 45, as shown, or the movement can be automated by any of a variety of mechanisms, such as by an axle affixed to the actuation disk 43 or a combination of teeth on the outer circumference of actuation disk 43 and gears engaging the teeth.

In one embodiment of the invention, spiral grooves 42 are not cut completely through actuation disk 43, and the lower tips of pins 41 are each provided with a small ball bearing, which rides in spiral grooves 42.

Figure 11:
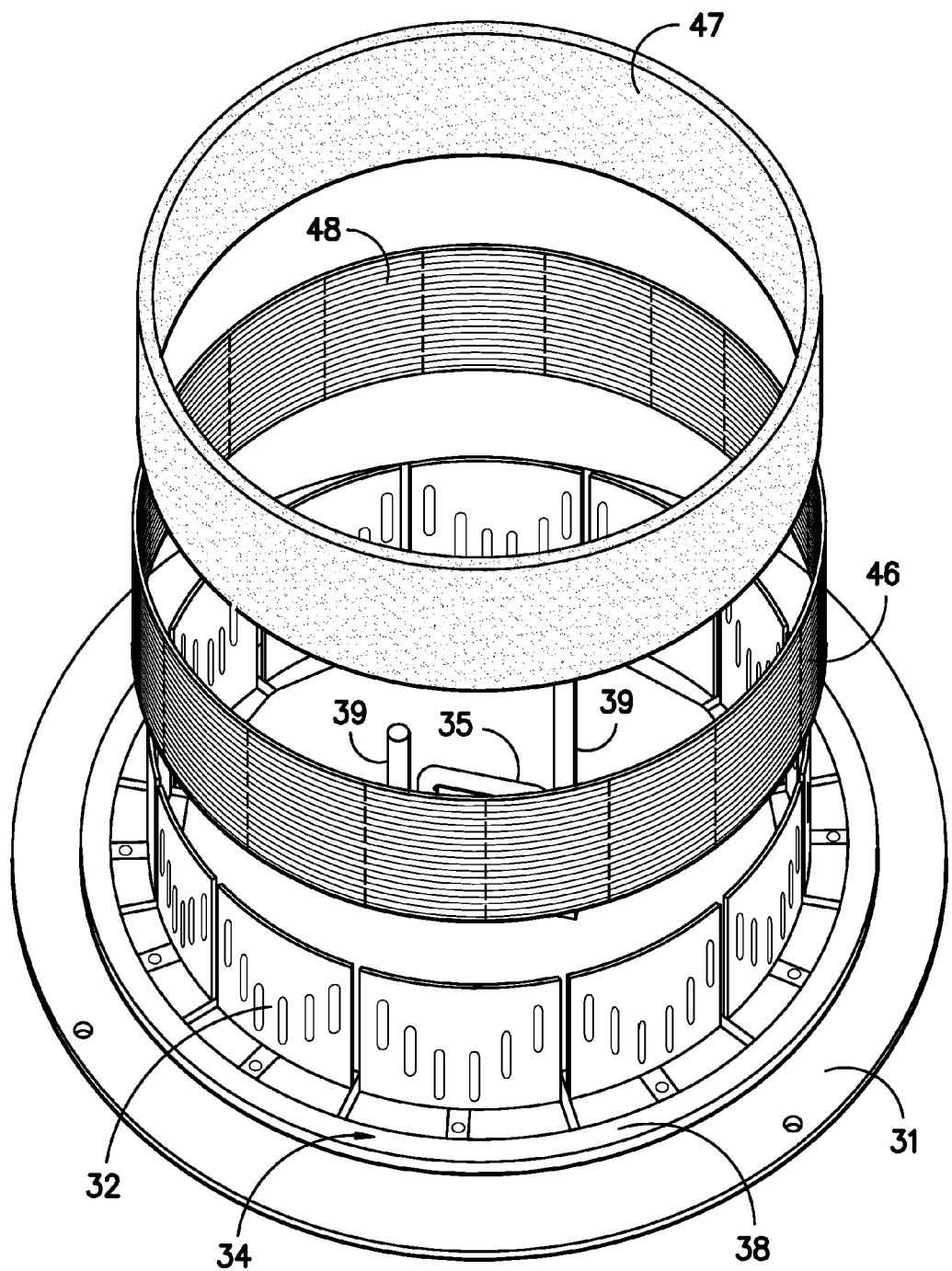
FIG. 11 is an exploded, top perspective view of the spacing element and outer reinforcement band being placed on the insertion machine.
Figure 12:
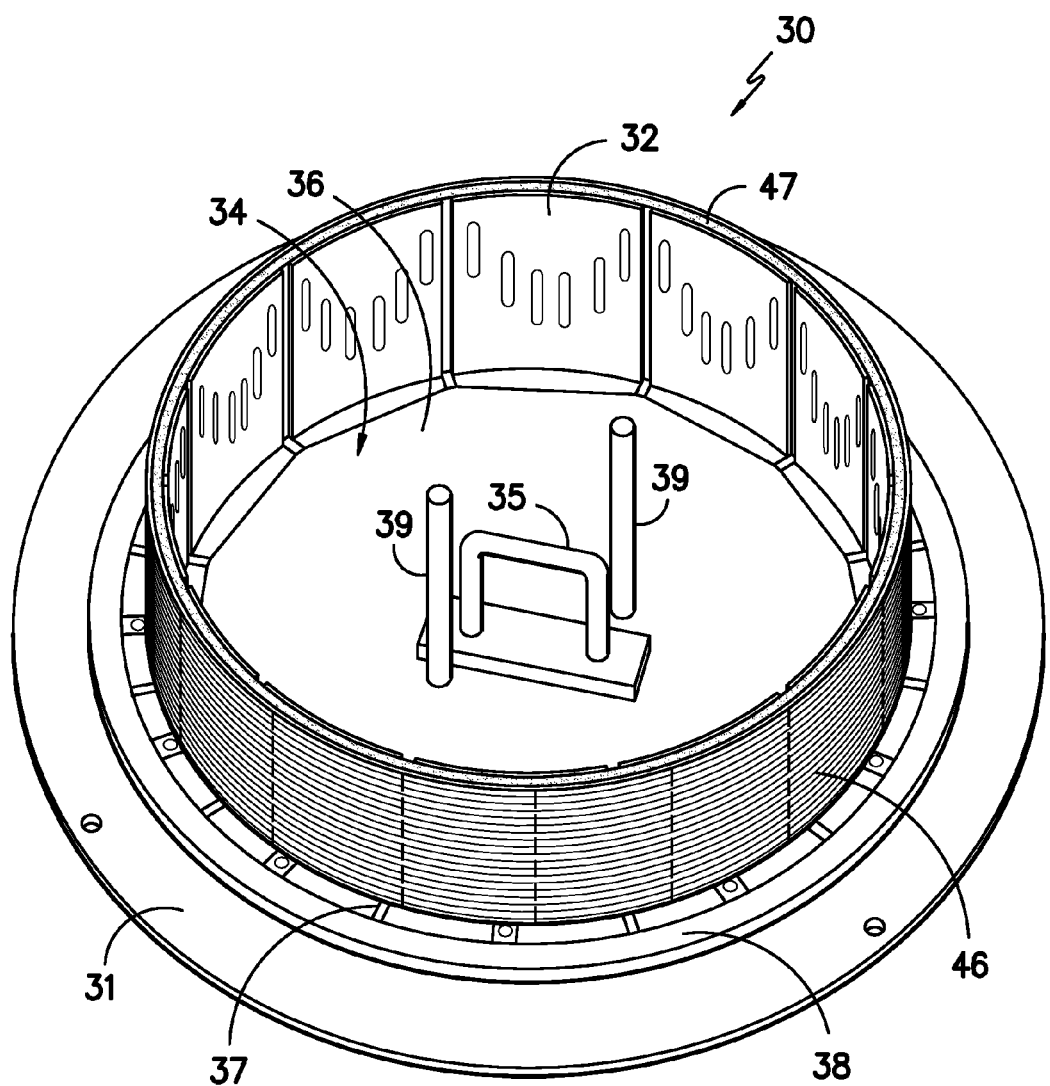
FIG. 12 is a top perspective view of the spacing element and outer reinforcement band in place on the insertion machine.

Referring to FIGS. 11 and 12, outer reinforcement band 46 and spacing element 47 are placed around plates 32, while plates 32 are in their retracted position, that is, drawn inward to the center of base 31. In one embodiment of the invention, spacing element 47 is placed against the inside face 48 of reinforcement band 46, before the outer reinforcement band and the spacing element are positioned on insertion machine 30. As shown in FIG. 12, outer reinforcement band 46 and spacing element 47 are placed on frame 34, which is supported on base 31.

Figure 13:
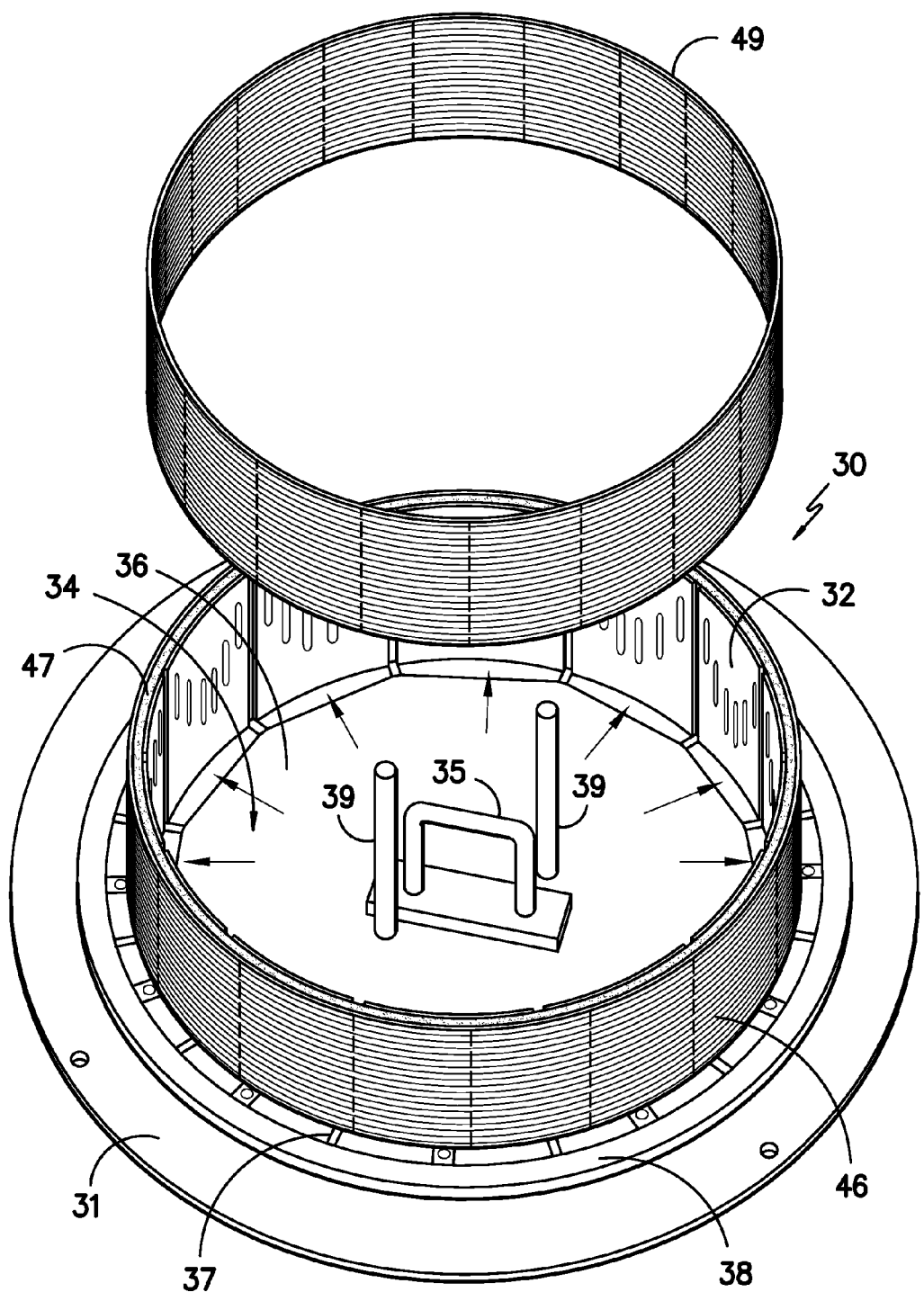
FIG. 13 is an exploded, top perspective view of the plates extended to compress the spacing element to allow insertion of the inner reinforcement band.

Next, plates 32 are extended radially outward by rotating actuation disk 43 to compress spacing element 47 against the inside face 48 of outer reinforcement band 46, prior to insertion of inner reinforcement band 49, as shown in FIG. 13. Thus, it is possible to assemble the annular reinforcement structure 50, shown in FIG. 15, without kinking or otherwise causing the circumference of inner reinforcement band 49 to be temporarily reduced to fit within the spacing element.

Figure 14:
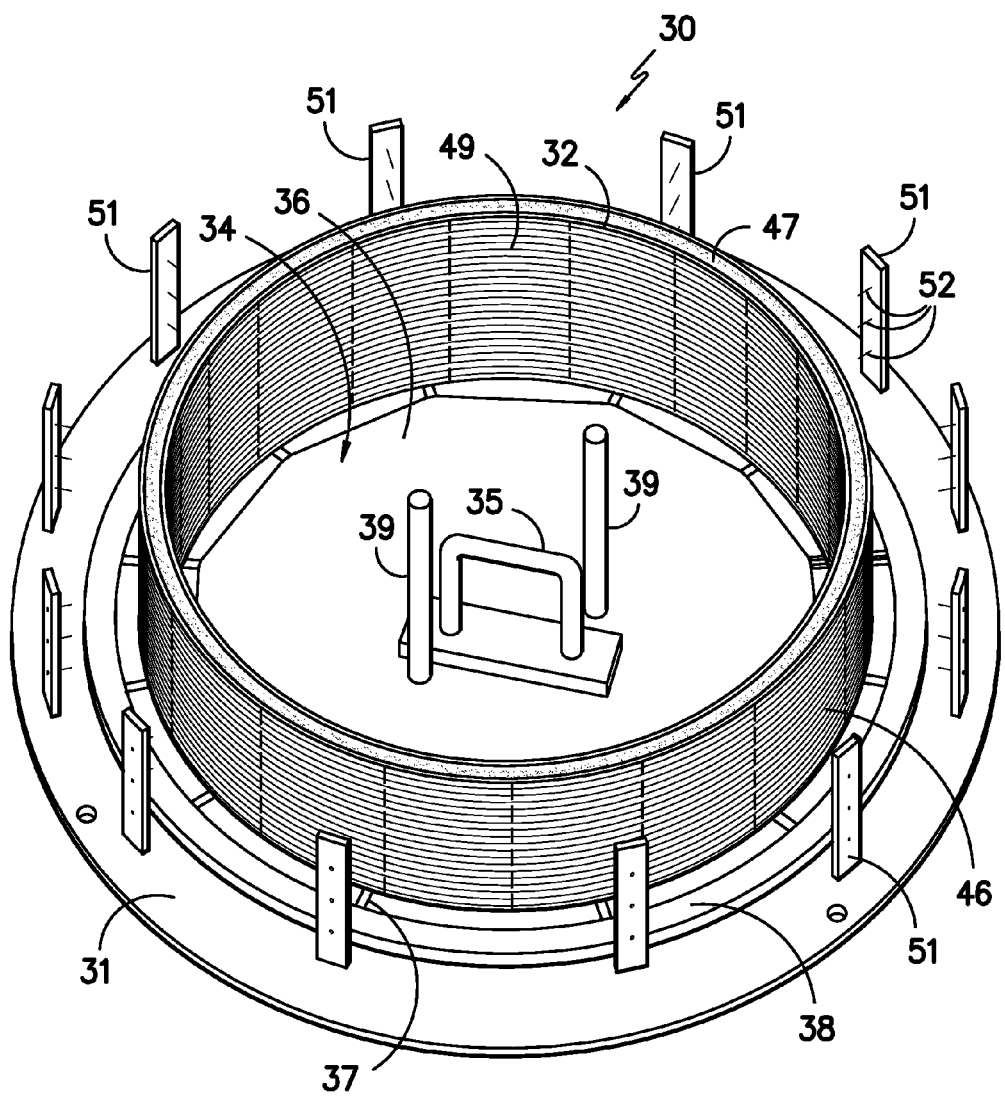
FIG. 14 is an exploded, top perspective view of the pin plates used to distribute force axially, when the annular reinforcement structure is removed from the insertion machine.

Referring to FIGS. 14 and 15, the process of separating annular reinforcement structure 50 from insertion machine 30 may be facilitated by employing pin plates 51, each having an array of pins 52 distributed along their length. Pins 52 penetrate outer reinforcement band 46, spacing element 47 and inner reinforcement band 49, and may extend through inner reinforcement band 49. The bottom of pin plates 51 rest on spokes 37 of frame 34. Thus, pins 52 are spaced both axially and circumferentially around annular reinforcement structure 50.

Annular reinforcement structure 50 is separated from insertion machine 30 by lifting on handle 35 to raise frame 34, with spacing element 47 retained between the outer reinforcement band 46 and the inner reinforcement band 49. Force is distributed to annular reinforcement structure 50 by frame 34, pin plates 51 and pins 52. Accordingly, when annular reinforcement structure 50 and insertion machine 30 are separated, the force is distributed evenly, rather than acting only on the bottom edge of annular reinforcement structure 50.

Prior to lifting frame 34, plates 32 may be partially retracted, thereby decreasing the frictional resistance between the convex side 33 of plates 32 and spacing element 47. Plates 32 may be provided with a coating, such as polytetrafluoroethylene, to reduce friction.

In the method of placing a resilient spacing element against the inside face of the outer reinforcement band and compressing the spacing element with a jig, no particular order of assembly is required. For example, the spacing element may be inserted against the inside face of the outer reinforcement band first, and the jig inserted against the spacing element second. Alternatively, the jig may be inserted within the outer reinforcement band first, and the spacing element inserted between the jig and the inside face of the reinforcement band second, such as by deflecting the jig radially inward to accommodate the spacing element.

The method of making the annular reinforcement structure disclosed herein for two reinforcement bands and a spacing element could be repeated with a third reinforcement band and second spacing element, to produce an annular reinforcement structure having three reinforcement bands, with each band separated by a spacing element. For example, employing the methods and apparatus disclosed herein, it is possible to first assemble an outer reinforcement band and an intermediate reinforcement band with a spacing element interposed between, followed by assembly of the inner reinforcement band with a second spacing element between the inner reinforcement band and the intermediate reinforcement band.

Reinforced Matrix Material

The annular reinforcement structure of the present invention may be used to reinforce a matrix material. The annular reinforcement structure may be covered with the matrix material, that is, the matrix material covers at least one surface of the structure, for example, the outside face of the outer reinforcement band. The annular reinforcement structure may be embedded in the matrix material. It is also within the scope of the invention for spacing element to be porous and the matrix material to permeate the pores, followed by curing the matrix material. In still another embodiment of the invention, a first matrix material may be introduced into the space between the inner and outer reinforcement bands, and a second matrix material may be used to cover the surface of or embed the annular reinforcement structure.

Figure 16:
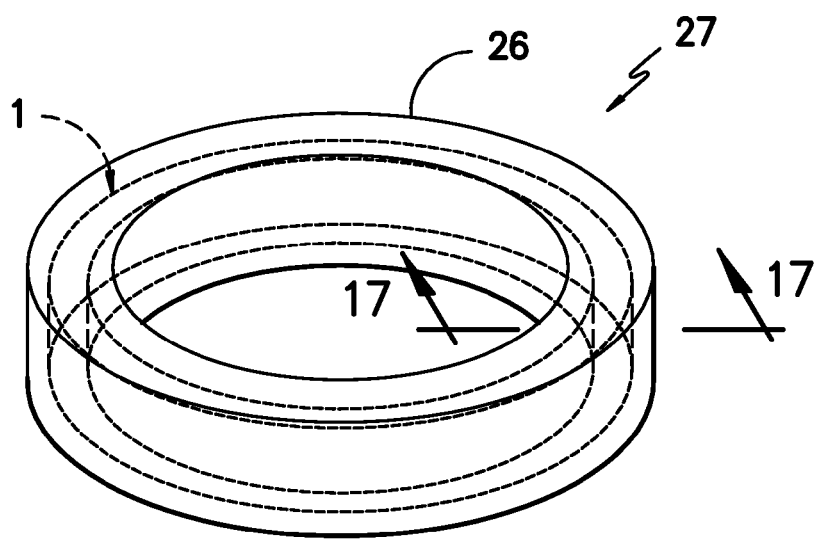
FIG. 16 is a top perspective view of the annular reinforcement structure embedded in a matrix material.
Figure 17:
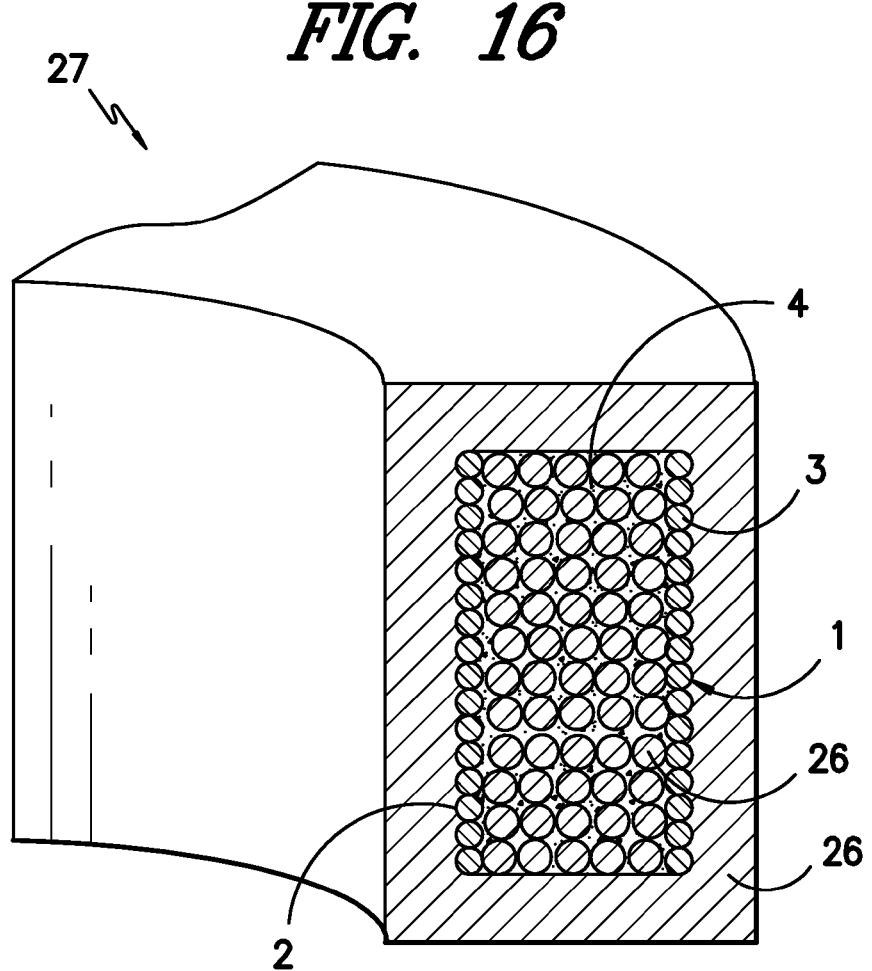
FIG. 17 is a side cross-section view of the annular reinforcement structure embedded in a matrix material.

Referring to FIGS. 16 and 17, the annular reinforcement structure 1 is shown embedded in a matrix material 26, to create reinforced ring 27. Depending on the selection of the matrix material, whether the spacing element is porous, such as an open-cell polymer foam, and the processing conditions, the matrix material may or may not permeate the spacing element. In the embodiment of the invention shown in FIG. 16, the matrix material has permeated the open-cell spacing element 4 and the voids in the polymer foam are filled with matrix material 26.

The matrix material may be selected from a wide range of organic and inorganic materials, especially those that may be cast with the annular reinforcement structure embedded therein. By way of example, the matrix material may be a natural or synthetic polymer, including thermoplastic and thermosetting materials. Of particular interest are elastomeric matrix materials, such as natural or synthetic rubber, polyurethane, segmented copolyester, polyamide co-polymer and thermoplastic elastomers. In one embodiment of the invention, spacing element 4 is a reticulated, polyurethane foam and the matrix material 26 is a polyurethane polymer formed without a blowing agent, that is, substantially without voids, which permeates the voids in the polyurethane foam. In another example, the matrix material is a ceramic, concrete or organometalic compound.

Also within the scope of the present invention are processes in which the spacing element is a polymer foam, and the polymer is a relatively low melting temperature thermoplastic and is partially or completely melted during the process of embedding the annular reinforcement structure in a matrix material. For example, a thermoplastic polymer foam spacer could be melted by the introduction of a matrix material, either because the matrix material is heated or involves an exothermic reaction. Alternatively, the polymer foam spacer could be melted or dissolved, prior to introduction of the matrix material, after the spacer has served its function of maintaining the relative orientation of the inner and outer reinforcement bands.

The invention may be further understood by reference to the following claims.

What we claim is:

1. A method of making an annular reinforcement structure having a first reinforcement band and a second reinforcement band, and a resilient spacing element positioned between the first and second reinforcement bands, maintaining the first and second reinforcement bands in a spaced apart, concentric relationship, comprising the steps of:
   (a) placing the resilient spacing element against a face of the first reinforcement band;
   (b) compressing the resilient spacing element against the face of the first reinforcement band, adjacent a top edge of the first reinforcement band, with a jig;
   (c) sliding the second reinforcement band in an axial direction relative to the first reinforcement band, from the top edge of the first reinforcement band towards a bottom edge of the first reinforcement band, while the resilient spacing element is compressed by the jig, whereby the first and second reinforcement bands are concentric, and the jig is positioned between the resilient spacing element and the second reinforcement band; and
   (d) removing the jig from between the first reinforcement band and the second reinforcement band, whereby the resilient spacing element is retained in place between the first and second reinforcement bands; and
      wherein the resilient spacing element is a reticulated, polyurethane foam having a fraction of voids to net volume of 90% or greater.

2. The method of claim 1, wherein the resilient spacing element has a thickness in the radial direction that is greater than the radial distance between the first and second reinforcement bands, when the first and second reinforcement bands are in a concentric relationship.

3. The method of claim 2, wherein the resilient spacing element is an open-cell, polymer foam having a fraction of voids to net volume of 75% or greater.

4. The method of claim 1, wherein the resilient spacing element extends in the axial direction from the top of the first reinforcement band to a distance below the jig, when the resilient spacing element is compressed against the face of the first reinforcement band, and the second reinforcement band frictionally engages the resilient spacing element below the jig, prior to removal of the jig from between the second reinforcement band and the resilient spacing element.

5. The method of claim 1, wherein the resilient spacing element is an annular band comprising an open-cell, polymer foam.

6. The method of claim 1, wherein the resilient spacing element is comprised of a plurality of discrete shims comprising an open-cell, polymer foam.

7. A method of making an annular reinforcement structure, comprising the steps of:
   (a) placing a resilient spacing element against an inside face of an outer reinforcement band, wherein the resilient spacing element is selected from the group consisting of (i) an annular band, and (ii) a plurality of discrete shims, arranged around a circumference of the outer reinforcement band;
   (b) compressing the resilient spacing element against the inside face of the outer reinforcement band, with a jig;
   (c) sliding an inner reinforcement band in an axial direction relative to the outer reinforcement band, from a top edge of the outer reinforcement band towards a bottom edge of the outer reinforcement band, while the resilient spacing element is compressed by the jig, whereby the inner reinforcement band is positioned inside the outer reinforcement band and the resilient spacing element, and the inner and outer reinforcement bands are concentric; and
   (d) removing the jig from between the inner reinforcement band and the resilient spacing element, whereby the resilient spacing element is retained in place between the inner reinforcement band and the outer reinforcement band.

8. The method of claim 7, wherein the resilient spacing element has a thickness in the radial direction that is greater than the radial distance between the inner and outer reinforcement bands, when the inner and outer reinforcement bands are concentric.

9. The method of claim 7, wherein the resilient spacing element is an open-cell, polymer foam having a fraction of voids to net volume of 75% or greater.

10. The method of claim 7, wherein the resilient spacing element is a reticulated, polyurethane foam having a fraction of voids to net volume of 90% or greater.

11. The method of claim 7, wherein the resilient spacing element extends in the axial direction from a top of the outer reinforcement band to a distance below the jig, when the resilient spacing element is compressed against the face of the outer reinforcement band, and the inner reinforcement band frictionally engages the resilient spacing element below the jig, prior to removal of the jig from between the inner reinforcement band and the resilient spacing element.

12. The method of claim 7, wherein the resilient spacing element is an annular band comprising an open-cell, polymer foam.

13. The method of claim 7, wherein the resilient spacing element is comprised of a plurality of discrete shims comprising an open-cell, polymer foam.

14. A method of making a reinforced matrix material, comprising the steps of:
   (a) placing a resilient, porous spacing element against a face of a first reinforcement band;
   (b) compressing the resilient, porous spacing element against the face of the first reinforcement band, adjacent a top edge of the first reinforcement band, with a jig;
   (c) sliding a second reinforcement band in an axial direction relative to the first reinforcement band, from the top edge of the first reinforcement band towards a bottom edge of the first reinforcement band, while the resilient, porous spacing element is compressed by the jig, whereby the first and second reinforcement bands are in a concentric relationship, and the jig is positioned between the resilient, porous spacing element and the second reinforcement band; and
   (d) removing the jig from between the first reinforcement band and the second reinforcement band, whereby the resilient, porous spacing element is retained in place between the first and second reinforcement bands; and
   (e) introducing a liquid matrix material in the space between the first reinforcement band and the second reinforcement band and curing the liquid matrix material.

15. The method of claim 14, wherein the resilient, porous spacing element has a thickness in the radial direction that is greater than the radial distance between the first and second reinforcement bands, when the bands are concentric.

16. The method of claim 15, wherein the resilient, porous spacing element is an open-cell, polymer foam having a fraction of voids to net volume of 75% or greater.

17. The method of claim 15, wherein the resilient, porous spacing element is a reticulated, polyurethane foam having a fraction of voids to net volume of 90% or greater.

18. The method of claim 15, wherein the resilient, porous spacing element is a polyurethane foam, and the liquid matrix material is a polyurethane polymer, and the liquid matrix material fills the voids in the resilient, porous spacing element.

* * * * *